(12) United States Patent
Wallach

(10) Patent No.: US 8,223,213 B2
(45) Date of Patent: Jul. 17, 2012

(54) WIRELESS AND CCTV MEGAPIXEL DIGITAL CAMERA FOR SURVEILLANCE AND UNMANNED AIR VEHICLES

(75) Inventor: Alon Wallach, Ramat Gan (IL)

(73) Assignee: Wireless Avionics, Rosh Haain (IL)

( * ) Notice: Subject to any disclaimer, the term of this patent is extended or adjusted under 35 U.S.C. 154(b) by 773 days.

(21) Appl. No.: 11/634,181

(22) Filed: Dec. 6, 2006

(65) Prior Publication Data

US 2008/0002045 A1 Jan. 3, 2008

Related U.S. Application Data

(60) Provisional application No. 60/742,618, filed on Dec. 7, 2005.

(51) Int. Cl.
*H04N 5/232* (2006.01)

(52) U.S. Cl. .................. 348/211.4; 348/211.6

(58) Field of Classification Search ............... 348/207.1, 348/207.9, 207.11, 211.1–211.4, 348, 359, 348/211.6; 725/105, 109, 110
See application file for complete search history.

(56) References Cited

U.S. PATENT DOCUMENTS

| | | | | |
|---|---|---|---|---|
| 5,486,853 A * | 1/1996 | Baxter et al. | ............... | 348/222.1 |
| 6,043,837 A * | 3/2000 | Driscoll et al. | ................. | 348/36 |
| 6,205,199 B1 * | 3/2001 | Polichar et al. | .............. | 378/98.8 |
| 6,717,607 B1 * | 4/2004 | Lauper et al. | .............. | 348/14.08 |
| 7,131,136 B2 * | 10/2006 | Monroe | ........................ | 725/105 |
| 2003/0177500 A1 * | 9/2003 | Nakamura et al. | ............ | 725/105 |
| 2004/0008253 A1 * | 1/2004 | Monroe | ........................ | 348/143 |
| 2004/0141070 A1 * | 7/2004 | Chiku et al. | .............. | 348/231.99 |
| 2005/0057542 A1 * | 3/2005 | Plut | .............................. | 345/204 |
| 2005/0134681 A1 * | 6/2005 | Kim | ............................ | 348/14.01 |
| 2005/0146610 A1 * | 7/2005 | Creamer et al. | ........... | 348/207.1 |

* cited by examiner

Primary Examiner — Tuan Ho

(57) ABSTRACT

A system for Unmanned Air Vehicles and security applications that enables the use of a megapixels commercial digital camera with high resolution stills picturing capability, integrated with a camera control interface unit, long range wireless analog video link or CCTV link having 5 MHz bandwidth, but still able to transmit the high resolution pictures in full, by breaking the megapixels stored picture of the digital camera to a multitude of "subpictures", each limited in resolution and 5 Mhz bandwidth.
The wireless received analog video "subpictures" stream feed a P.C with frame grabber and software that reconstruct the complete megapixels picture.

9 Claims, 2 Drawing Sheets

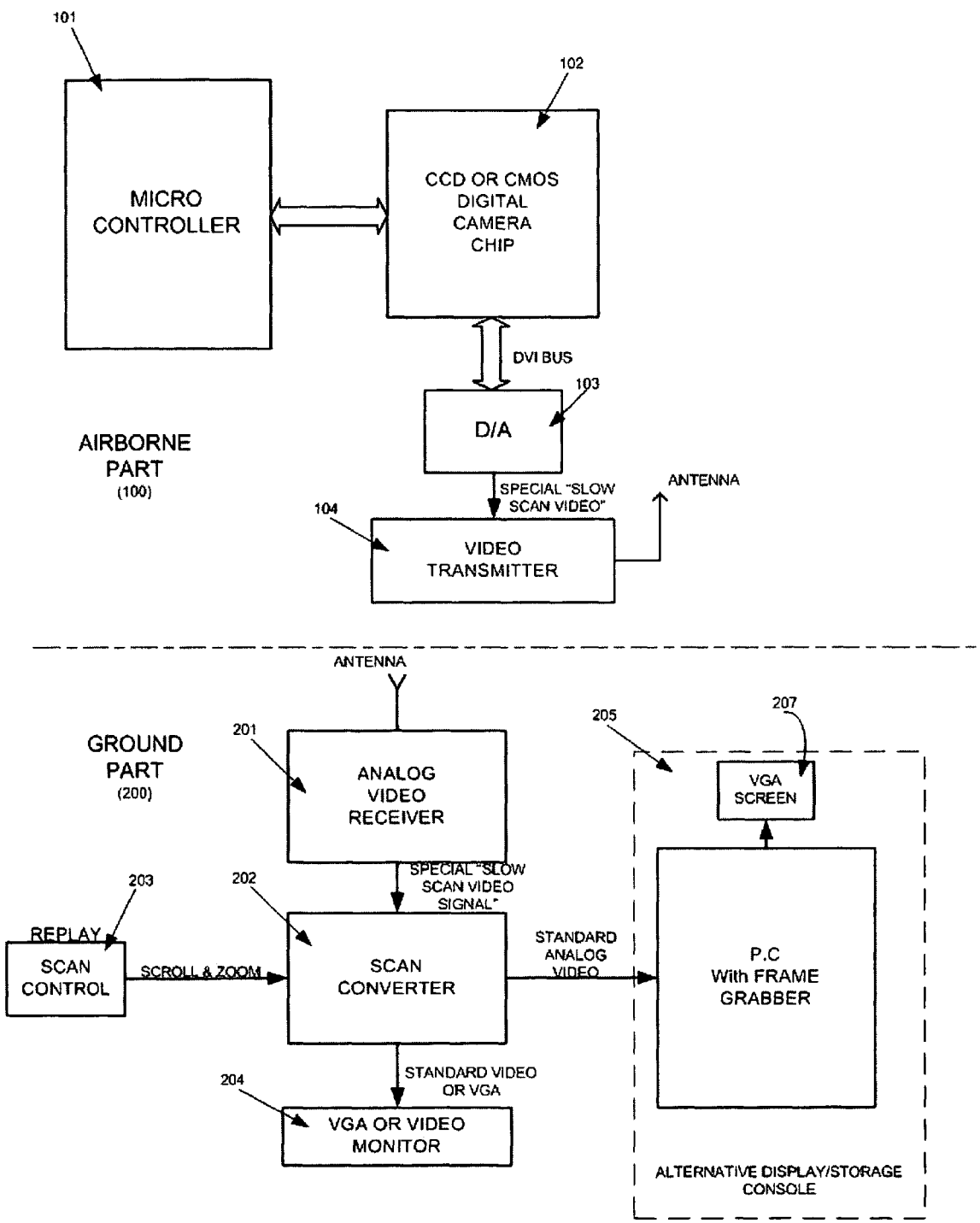

WIRELESS AND CCTV MEGAPIXEL DIGITAL CAMERA FOR SURVEILLANCE AND UNMANNED AIR VEHICLES

CROSS-REFERENCE OF THE RELATED APPLICATIONS

The present application claims priority from U.S. Provisional application Ser. No. 60/742,618, filed Dec. 7, 2005.

FIELD OF THE INVENTION

The present invention relates to systems for transmitting high resolution or high definition "stills" pictures from digital cameras over wireless links, and in particular using analog wireless or cable video links in conjunction with a very high resolution picture from a commercial digital camera, to relay a full resolution image over long ranges. It is assumed that the reader has a background in digital picture techniques, analog video transmission techniques and basic understanding of the limitations of digital data links, in order to understand and appreciate the merits and ingenuity of this invention.

BACKGROUND OF THE INVENTION

It is a fact that digital cameras have taken the place of most standard 35 mm. film cameras. The reason is that digital cameras today offer a high quality picture with 3, 4, 5 or even 10 megapixels in reasonable prices. This quality of picture is practically comparable to 35 mm. film pictures for digital cameras exceeding 3 megapixels.

There is a basic limitation however when using digital cameras. They are intended for "stills" picture (and sometimes also low resolution standard video filming) and therefore store the high resolution pictures in flash disks for later "off line" download to a P.C. computer. This download is usually done through a USB type cable (or over very short range wireless link like wireless USB extender).

Another form of download or "playback" is by using the "video out" or A/V analog output of the digital camera and connecting it to a video monitor or TV. This output however is limited from its nature to a vertical resolution of approximately 600 lines of pixels (the number of scanned lines in every video frame, or two interlaced video fields—odd and even) and a horizontal resolution of approx. 650 pixels (the number of black/white cycles possible within the normal 5 MHz bandwidth in timeframe of a single horizontal line—64 microseconds).

> 64 uSec/100 nSec=640(100 nSec is the half cycle time of a 5 MHz signal).

The PC download gives the ultimate original resolution of the picture, but it is not suitable for real time download needed for long range wireless transmission. In order to extract the picture with its highest resolution (e.g. 3 megapixels or higher), and transmit it through a long range wireless link (in contrast with short range wireless LAN, Bluetooth etc . . . ), one needs to be able to communicate and handshake with a digital camera having a "slave" type USB interface, get the picture in a bitmap, JPEG or DVI format, and "pipeline" it through a very wideband wireless link that has a modem at both sides.

A compressed JPEG type picture of 3 megapixels (3 M×10 bit=30 Mb uncompressed), will have a typical size of 300 KB, or a minimum of 2.4 Mb of data, needing a very high quality wideband wireless link with modems+some pre and post processing to compensate for data loses and errors.

The difficult interfacing with the USB port of the camera (needing a PC type platform with operating system and software driver for the camera), and the high demands from the wireless link, make the long range USB type digital extraction extremely cumbersome, complicated and almost impossible in applications like mini UAVs (Unmanned Air Vehicles).

As explained before, the analog video output of the digital camera does give a real time output of the picture being taken or replayed, but it can not possibly display the full resolution of the stored picture in the camera in one single picture. You can either see the whole picture in low resolution, or a fraction of it in high resolution.

Another problem is that the most common video link today in UAVs is the analog video link capable of passing a real time standard video signal, 25 frames per second, with the above mentioned frequency limitations (5 MHz bandwidth, enough roughly to pass 650 pixels per line times 600 lines per picture, or roughly 0.3 megapixels per picture, 25 times per second). In wired closed circuit security observation systems (CCTV), the analog video link is still a major standard, with more or less the same specifications. It is therefore a matter of necessity to interface a low cost but high resolution digital camera to the existing video link of the UAV or a CCTV video link, while doing it with minimum of weight and cost, and getting the received picture on the ground (or monitor side for CCTV) with its original highest resolution with enough robustness to link noise, and in the best update rate.

The purpose of the invention is to show how to use, integrate and interface the digital camera in a UAV equipped with an analog video link, to achieve a near real time stream of megapixels stills pictures on a PC screen on the ground. The invention is useful in any remote sensing application needing high resolution pictures to be pipelined through an analog link (or even digital close to real time video links with composite video interface type).

PRIOR ART

Digital high resolution cameras are a reality, not fiction, but their use in long range wireless applications is very uncommon due to interfacing and link problems.

The most known way of using digital cameras in wireless applications is to connect the USB port of the camera to a wireless USB extender. This is a rather standard computer accessory, but it is technically (because of technical and regulatory reasons) range limited to tens of meters. Other options include the use of wireless LAN units, but this will require having a PC platform near the digital camera, and even then, the wireless LAN is also range limited to several hundreds of meters.

Passing the pictures over kilometers and tens of kilometers is very far from the capabilities of all known digital commercial link options. Analog video links are known "workhorses" for decades, but due to their bandwidth limitations and inability to change the line and field scanning rates of cameras and monitors, cannot transfer megapixels pictures.

DVI format is a pseudo analog signal built from a stream of bytes, each expressing a pixel color and intensity, in a line and field pattern. This kind of signal can be converted to a non standard analog type video signal, but any further treatment of this signal is very problematic due to synchronization and video grabbing standards. The second embodiment of the invention will cover such a solution and how to overcome those objective obstacles.

It is because of these practical technical limitations of wireless links, and the basic intended "civilian" use of commercial digital cameras with USB download, that a long range wireless transmitting of high resolution pictures is so difficult.

SUMMARY OF THE INVENTION

The will to use the low cost commercially available high resolution stills pictures digital cameras that every tourist carries today, in demanding UAV and security applications, led to the need for a means to combine the need and application to the existing cameras on the market.

The present invention will be shown in 2 embodiments. The 1$^{st}$ embodiment will show a real commercial digital camera with the invented interface around it to extract the picture and send (transmit) it through an analog video wireless or wired link.

On the viewing (receiving) side, at the other side of the video link, a second interface is getting the information and interfaces it to a personal computer (P.C.) with software. The concept is to extract the picture from the digital camera, through its analog video output (A/V output), by zooming the replayed picture and scrolling in zoom over the complete picture. The result is a series of "subpictures" that together can be used to reconstruct correctly the original very high resolution picture that the camera took and stored in its flash memory.

As shown in the 1$^{st}$ embodiment drawing, the commercial megapixel camera is remotely operated through an IR remote control unit (that can be a commercially available item). Additionally (or instead of the IR control), some of the camera's switches can be mechanically pressed by small servo motors or electrically operated by analog switches.

A microcontroller can control all this sequential "washing machine" cycle that takes a full picture from the camera's memory and "breaks" it to as many subpictures as necessary.

Alternatively, the system can be configured to "zoom" just on a selected part of the megapixel picture, where the picture seems especially interesting. In this case, the user in the receiving side has to manually select (by zoom, left/right turn and up/down switches) part of the picture he wants to see zoomed in high resolution, and the microcontroller will give the right command to the camera to output this "subpicture".

The reconstruction of the stream of subpictures to a complete megapixel picture is done by a P.C. that receives all the subpictures, each with its ID (the ID indicates the place of each particular subpicture in the big megapixel picture). The PC has special dedicated (proprietary) software that takes all the subpictures, cuts the excess information from them, and stitches them together to build the "puzzle". The result is a very big JPEG (or BMP) file that can be displayed, zoomed, saved, transferred, copied etc . . . .

The 2$^{nd}$ embodiment shows a different way of sending the megapixel information over a standard analog wireless video link. In this embodiment the CMOS or CCD sensor chip of the digital camera is used directly. This implementation will usually involve just a digital image sensor rather than a complete commercial digital camera.

Most megapixel CMOS chip cameras have their pixels arranged in rows and columns. It is possible to use the DVI digital output of the chip camera to go sequentially over the complete pixel array. It is done by configuring to this mode and simply clocking the chip in the correct rate. If you take the DVI parallel bits to a digital to analog converter, the result will be a stream of analog voltages, which represent all the pixels in a continuous manner, line by line.

Since a several megapixels picture includes more than 1000 lines (usually 1000 to 3000 lines), the above mentioned picture rate will essentially be much slower than the 25 Hz of a standard video signal. If a standard video has around 300 lines per field and 600 lines per frame, the megapixel frame which can include 3000 lines should essentially take 5 times more time.

In addition, if a standard video line has 600 pixels and is 64 microseconds long, a 3000 long pixel line will essentially be 5 times longer. So, a 3000×3000 pixels picture (9M) will take about 25 times longer to pass than a standard video frame of 640×480 pixels. Namely 40 mSec×25=1 second. This is logical since the 9M pixels picture has 30 times more pixels or information than the 640×480=307K pixels of the standard video picture.

If you clock the chip camera at the right rate, so that the analog video link can still pass it with good fidelity, the receiver will have the same "slow scan" video at its output. This slow scan video will look like a normal video signal, with lines, fields, vertical and horizontal Sync etc, but will have in the order of 1 second frame rate. This type of slow rate signal is not compatible with any monitor or computer input. In order to process it, a special "scan converter" on the ground, following the video receiver, memorizes the complete slow scan megapixels picture, and outputs a standard video output again, with a normal 25 Hz frame rate. This output can either be a sequential subpictures flow, like in the 1$^{st}$ embodiment that builds a big puzzle, or one zoomed fraction of the big picture. The selection between these 2 options can be done by the operator using the "replay scan control unit" (203).

It can be seen, that although the 2 embodiments seem quite different, they share the same picture sensor (megapixels digital CCD or CMOS), the same limited bandwidth (5 MHz) analog video link, and same way of dividing the big megapixels picture into several standard video subpictures.

The 1$^{st}$ embodiment is a more immediate low cost implementation for all kinds of commercial digital cameras, while the 2$^{nd}$ embodiment is a more "professional" tailored solution for a specific CMOS chip. They both use the same concept of "pipelining" the megapixels information through the standard 5 MHz bandwidth analog video link, which is widely in use in UAV and security applications.

BRIEF DESCRIPTION OF THE DRAWINGS

The invention describes two ways of using digital cameras and transmitting their output over a standard "old fashion" wireless video link, typical to a UAV application. Two diagrams shows the 2 possible embodiments, marked FIG. 1 and FIG. 2. Each diagram is divided into 2 sections: upper half of page for the airborne part and lower half of page for the ground part.

1$^{st}$ Embodiment

The drawing marked

Figure 1:
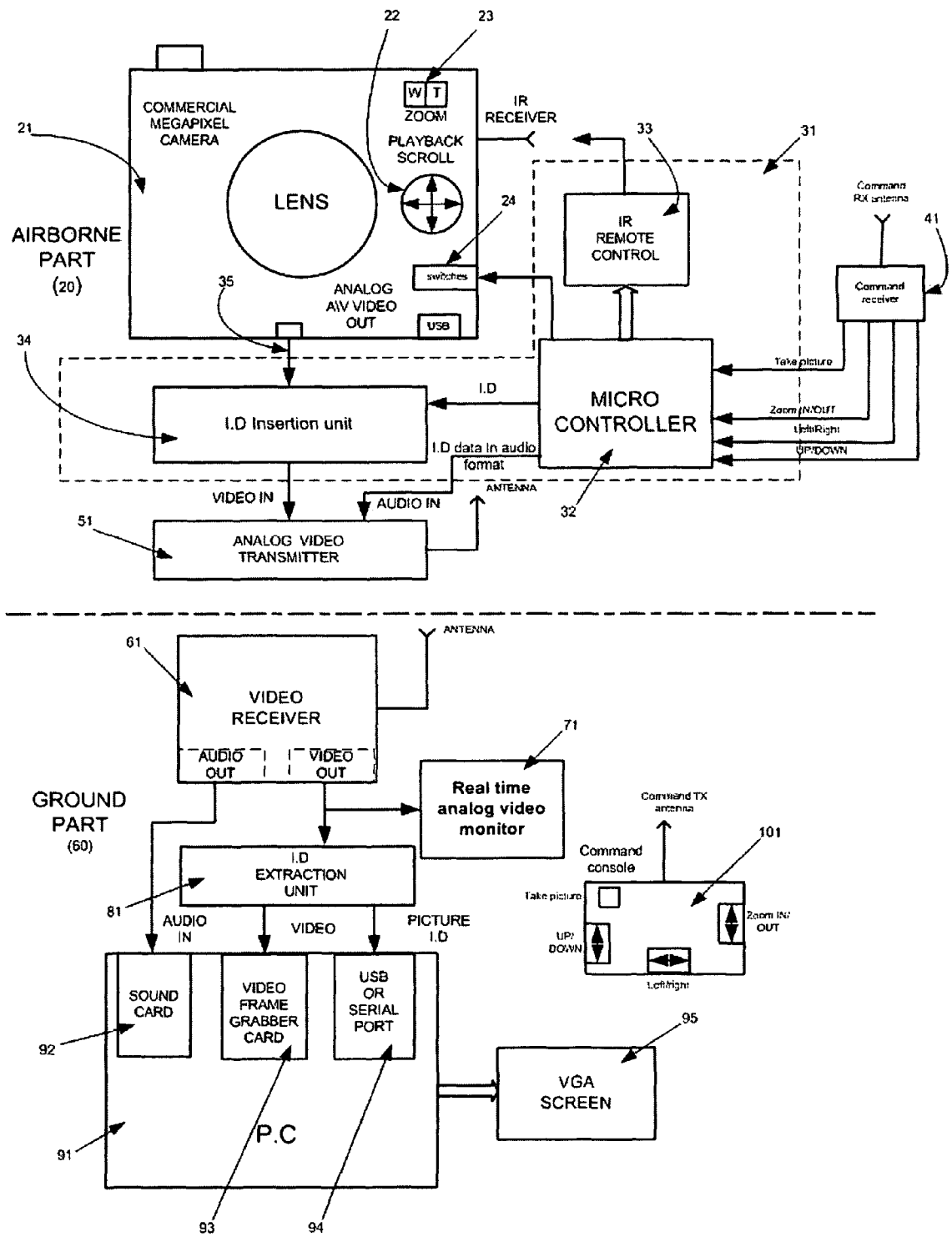
FIG. 1 shows the proffered embodiment of the invention. It shows in its upper part (airborne part 20) the commercial digital camera 21, with its lens, zoom control buttons 23, playback scrolling control buttons 22, other switches 24, A/V (analog video and audio) output 35, USB connector. The A/V output is connected to an I.D insertion unit 34, which in turn connects to the analog video transmitter 51.

The airborne interface subsystem 31 includes in addition to the I.D insertion unit also the microcontroller 32 and the IR remote control unit 33. The Command receiver 41 is an optional unit working in conjunction with the command console 101 of the ground part.

The ground unit includes the video receiver 61 with its video and audio outputs, a possible ID extraction unit 81 (extracting subpicture ID from the video signal), or an alternative sound card 92 that resides in the P.C 91 and can extract the ID from the audio signal. The P.C 91 also includes a video frame grabber card 93 and a USB or serial port 94 that can read the ID output signal of the ID extraction unit 81.

The PC 91 is connected to a VGA screen 95 that is used to see the high resolution picture. The software in the P.C together with the frame grabber and the ID signals are the base of reconstruction of the high resolution "puzzle", built from numerous subpictures. A real time analog video monitor 71 is useful to see a single frozen zoomed subpicture or to monitor the subpictures stream coming from the airborne part. The Command console 101 enables the operator to take a picture when necessary, or to choose a particular fraction of the big picture by using the Zoom in/out, up/down and left/right buttons.

$2^{nd}$ Embodiment

The drawing marked FIG. 2 shows an alternative embodiment of the invention, and is also composed of an airborne part 100, and a ground part 200. The camera is a CCD or CMOS chip sensor 102, connected with its DVI bus to an external D/A 103. The output of the D/D is a "slow scan" video signal, used to drive the standard analog video transmitter 104.

The CCD or CMOS chip is configured and controlled by microcontroller 101, which cyclically takes a picture and scans the entire pixels of the camera to create the slow scan video stream.

On the ground part 200, we have the analog video receiver 201 with its video output giving the "slow scan" video signal, the "scan converter" 202 that stores the entire slow scan content and outputs a standard analog video signal and a VGA signal to drive the VGA screen 204, and the replay scan control console 203 that controls the mode of the scan converter 202 (full picture, fraction picture, which fraction selection etc. . . . ).

Additionally, an optional P.C 205, with its frame grabber card and VGA screen 207 can be useful for storing and replaying selected pictures.

DETAILED DESCRIPTION OF THE PRESENT INVENTION $1^{st}$ Embodiment

The $1^{st}$ embodiment in FIG. 1 shows a commercial 3 megapixels video camera 21 (like the Canon A75, or any of the Sony DSPC units etc.) connected to standard analog video transmitters 51 by its standard A/V out port 35 to the "video in" of the transmitter 51. The transmitter 51 is transmitting this video signal over the air which is then received by the video receiver 61. The distance can be from meters to hundreds of kilometers. When wanting to achieve a very long range, the receiver 61 can be connected to a directional antenna with higher gain and directed manually or automatically by a tracking system towards the transmitter.

These kind of video links are widely used in fixed or moving applications. Most video links are "non license" units with limited power output giving a range of up to several kilometers. The very long range links use higher power and require licensing, like in the case of military UAVs.

The way to send all the data of the picture through the analog video link, requires to "break" the high resolution picture into several standard video, relatively low resolution pictures, send them through the video link, and recompose them into one big picture again on the receiver side.

When breaking a picture to subpictures, some basic rules must be observed:

1) The subpictures must cover the entire picture, preferably with minimal or zero "overlap" between neighboring subpictures.
2) The subpictures should each be "tagged" so they can be "placed" at their right place in the "puzzle" on the receiving side. There are several ways to tag the subpictures, one way is to send them sequentially with relative long intermission (black picture) between the last subpicture of the $1^{st}$ puzzle to the $1^{st}$ subpicture of the next puzzle. Another way is to insert an ID or a number inside each subpicture. Canon, for example, allows an easy way to implement it as it shows a small square icon in the video output, whose size and location on the video picture shows which parts of the puzzle it covers. There are numerous other ways to mark a video frame with an I.D., like entering it into the non essential vertical blank interval (VBI) of the picture. Another way is to "blacken" or "whiten" a particular line in each subpicture. For example, the $5^{th}$ subpicture will have its $5^{th}$ line always totally black. There are advantages and disadvantages to every method its all a question of how much you disturb the content of the picture, how to extract the I.D. back from the video frames and how to tell the computer who is who. A straight forward solution to the problem is to use the audio channel of the video link to send the I.D. of the subpictures. This sounds easy, but could become more complicated when the audio track is used to send other essential digital data of the UAV system, like GPS information and other telemetries.

An essential part of the megapixel link system is to control the digital camera to output the subpictures sequentially. This requires to operate the camera in two modes, take picture and playback, and toggle between the two modes in relatively high rates (every few seconds or so). When in playback, the camera is "instructed" to make a zoomed view or inspection into the picture taken before by zoom button 23, and this zoomed section is sequentially moved in X and Y by the 2 axis scroll button 22, so the scrolling gradually covers the complete picture.

A practical sequence will include taking a picture in the picture mode, than toggling to playback, zoom in 5 "clicks" to get $5^{th}$ of the area of the picture, scroll 10 "clicks" in X, and 10 "clicks" in Y to reach the upper left corner of the picture, wait for 2 frames (2×50 mSec=100 mSec) so the subpicture will have a fair chance to be transmitted and received safely, then click 4 clicks to the right so the next subpicture is exactly the continuation of subpicture one, allow 2 frames for transmission/reception and so on for the next 18 subpictures until all 20 subpictures are sent. This procedure takes approximately 2 seconds to complete. So, at the end, every 2 seconds, the user can receive a full resolution 3 megapixel picture on the receiver side. Some commercial digital cameras are slow to react and the process could reach 10 to 15 seconds.

Getting the 20 subpictures sequentially on the video receiver's 61 output, requires now a PC computer 91 (or some other video processing unit) to combine the subpictures into one big 3 megapixels (or more) picture. There is no practical way to see such a high resolution picture at one glance on a screen. Trying to view it fully on one screen will cause loss of resolution. In order to get advantage of the full resolution, the picture has to be viewed in X and Y scrolling. The PC will take the subpictures, build from them one very large continuous puzzle which can be viewed and examined in detail. The PC has to "stitch" the puzzle by putting the pictures side by side and row below row in their correct and original order. As explained before, the PC will receive the video input on its video input by a "VIVO" VGA card or an additional frame grabber card 93. The I.D. of the subpictures can be part of the video signals (in the picture itself or VBI for example) or coming separately on the audio track or a data channel and decoded by sound card 92. The I.D. information is a very slow (one per video frame) and simple signal to pass, relative to the wideband video signal.

To control the camera to make the picturing and then the sequential playback of subpictures, one can do it with a series of relays that will be connected to the knobs 22, 23, 24 on the camera, or alternatively by "overriding" an IR camera remote control 33 (like the Canon WL-DC-100) by a microcontroller 32 that uses analog switches or digital discrete outputs that will "press" the buttons of the IR remote control in the right sequence. Using the IR remote control 33 requires less "playing around" with the digital camera 21.

It is sometimes necessary to control the flow of subpictures by selecting particular subpictures only. This can make the process considerably simpler to implement, but needs a command receiver 41 and a matching command console 101 that will allow such "focused zooming". It is obvious that making the same analog video procedure using the CCD or CMOS sensor directly, without buying a commercial digital camera, is straight forward and is essentially the same technology and invention.

$2^{nd}$ Embodiment

A $2^{nd}$ embodiment shows in FIG. 2 a similar way of sending a megapixel picture in an analog wireless video link or a CCTV video link. In this embodiment, the CCD 102 is scanned in its full rate, giving a digital DVI signal, or with the addition of a D/A converter 103 delivering analog video signal resembling a normal video signal, but because of the high resolution it is a much slower signal marked as "special slow scan video". Instead of a 325 lines per field standard video signal, this signal could have 1500 to 3000 links per field. Since this large number of lines is still restricted by the video link limited bandwidth, each line could take longer than the standard 64 usec, and will typically be 4 to 10 times longer in order to have the 2000 or more pixels information within a 5 MHz bandwidth. So a typical 3 megapixels (2000 pixels× 1500 lines) scan will take 2000×250 microsecond or 0.5 seconds per picture.

This will be a single megapixels picture coming in one long "video like" frame. Sending this over an analog video cable or video link should be no problem, but "grabbing" it into a computer will require an interface unit that will have to "grab" this huge scanned picture line by line and either store it in a 3 megapixels memory for later "replay", or output subpictures from this large memory to the computer.

This interface or "scan converter" 202 is very specialized and consequently quite expensive, but in large quantities that might rise in CCTV applications, could justify the mass production of such a unit in reasonable costs.

The $2^{nd}$ embodiment is therefore the right solution for mass production of the invention.

If the scanning mode of the CCD is changed from one long high resolution scan to a multi subpicture standard video scan, this embodiment converges back to the $1^{st}$ embodiment, whereas the video signal is a standard analog video signal of 325 lines, and each subpicture has a different I.D.

It is well understood that the scan converter in that case can be a replacement to the PC 91 of the $1^{st}$ embodiment, driving a VGA or video monitor 204 and being scrolled by a replay scan control unit 203 connected to the scan converter 202, to sequentially view full resolution subpictures, lower resolution full picture, or medium resolution combination of subpictures.

What is claimed is:

1. A system for conveying high resolution megapixels pictures from a megapixels digital camera to a video receiver over a analog video link, which comprises:
    said megapixels camera for capturing at least one stills megapixels picture, said camera is provided with a standard analog video output;
    a controller for (a) dividing within said camera each captured megapixels picture to a plurality of subpictures, each said subpicture maintaining the same resolution as said captured high resolution picture; (b) controlling the camera to serially output said high resolution subpictures in a standard video format via said analog output to a analog video link; and
    a PC or computing device for receiving said sequence of subpictures in said standard video format from said analog video link, and reconstructing from said sequence of subpictures said originally captured high resolution megapixels picture.

2. A system according to claim 1 wherein said digital camera comprises a digital CCD or CMOS picture sensor.

3. A system according to claim 1 wherein said standard video format is a slow scan megapixel analog scan.

4. A system according to claim 1 wherein said ID is not present, but rather the PC or computing device extracts the ID using a relatively long intermission between the end of one series of subpictures and the next series of subpictures, as a means to reset an ID counter.

5. A system according to claim 1, wherein the video link or cable is replaced by a digital or internet video link with limited bandwidth.

6. A system according to claim 1, wherein said standard camera analog video output is a standard analog A/V video out.

7. The system of claim 1 wherein each of said subpictures in said sequence is uniquely ID marked, either by some overlay contents or addition to each subpicture, an insert in its VBI (Vertical Blank Interval), in the audio channel of the video link or video cable, or in an auxiliary data channel, said ID is used to assist in reconstructing said high resolution picture.

8. A system according to claim 7 wherein said PC or computing, device shows all or part of the reconstructed picture on a VGA or another computer screen in said high resolution of said originally captured picture.

9. A system according to claim 8 wherein said analog video link is a cable link or a wireless link.

* * * * *